United States Patent
Hrle et al.

(10) Patent No.: US 11,030,194 B2
(45) Date of Patent: Jun. 8, 2021

(54) DEMAND-DRIVEN DYNAMIC AGGREGATE

(71) Applicant: INTERNATIONAL BUSINESS MACHINES CORPORATION, Armonk, NY (US)

(72) Inventors: Namik Hrle, Boeblingen (DE); Georg K. Mayer, Weil der Stadt (DE); Joachim Rese, Hockenheim (DE)

(73) Assignee: International Business Machines Corporation, Armonk, NY (US)

(*) Notice: Subject to any disclaimer, the term of this patent is extended or adjusted under 35 U.S.C. 154(b) by 373 days.

(21) Appl. No.: 14/645,643

(22) Filed: Mar. 12, 2015

(65) Prior Publication Data

US 2015/0261870 A1    Sep. 17, 2015

(30) Foreign Application Priority Data

Mar. 14, 2014    (GB) .................................... 1404521

(51) Int. Cl.
*G06F 16/2453*    (2019.01)

(52) U.S. Cl.
CPC .............................. *G06F 16/24539* (2019.01)

(58) Field of Classification Search
None
See application file for complete search history.

(56) References Cited

U.S. PATENT DOCUMENTS

| | | | |
|---|---|---|---|
| 6,023,695 A | 2/2000 | Osborn et al. | |
| 6,356,890 B1* | 3/2002 | Agrawal | G06F 16/2228 |
| 6,480,836 B1* | 11/2002 | Colby | G06F 16/24539 |
| | | | 707/717 |
| 6,865,569 B1* | 3/2005 | Gui | G06F 17/30457 |
| 6,882,993 B1* | 4/2005 | Lawande | G06F 16/2393 |
| | | | 707/714 |
| 7,092,951 B1* | 8/2006 | Luo | G06F 16/24539 |
| 7,191,169 B1* | 3/2007 | Tao | G06F 16/24539 |
| | | | 707/714 |
| 7,440,963 B1* | 10/2008 | Bello | G06F 16/24539 |
| 8,515,948 B2 | 8/2013 | Chen et al. | |
| 9,449,095 B1* | 9/2016 | Panda | G06F 17/30672 |
| 2003/0088541 A1* | 5/2003 | Zilio | G06F 16/22 |
| 2003/0093415 A1* | 5/2003 | Larson | G06F 17/30451 |
| 2004/0133538 A1 | 7/2004 | Amiri et al. | |
| 2004/0181521 A1 | 9/2004 | Simmen | |
| 2005/0235004 A1* | 10/2005 | Folkert | G06F 16/24539 |
| 2005/0283458 A1* | 12/2005 | Galindo-Legaria | |
| | | | G06F 16/24539 |
| 2006/0047696 A1* | 3/2006 | Larson | G06F 16/2393 |

(Continued)

OTHER PUBLICATIONS

Microsoft. Microsoft Access 2007 documentation. Jan. 2007. Retrieved Mar. 2017.*

(Continued)

*Primary Examiner* — Irene Baker
(74) *Attorney, Agent, or Firm* — Heslin Rothenberg Farley & Mesiti P.C.; William A. Kinnaman, Esq.

(57) ABSTRACT

An aggregate is generated. Upon receiving a second query comprising a filter criterion, a determination is made as to whether at least a threshold number of previous first queries comprises a similar filter criterion, and if so generating an aggregate using the similar filter criterion as an aggregation criterion, such that future queries comprising the similar filter criterion are satisfied by the aggregate.

16 Claims, 3 Drawing Sheets

(56) References Cited

U.S. PATENT DOCUMENTS

| | | | | |
|---|---|---|---|---|
| 2008/0016031 | A1* | 1/2008 | Miao | G06F 17/30454 |
| 2008/0097962 | A1* | 4/2008 | Santosuosso | G06F 16/24539 |
| 2009/0018991 | A1* | 1/2009 | Thiyagarajan | G06F 16/24534 |
| 2009/0019005 | A1* | 1/2009 | Hu | G06F 16/24539 |
| 2010/0318527 | A1* | 12/2010 | Nandy | G06F 17/3089 |
| | | | | 707/754 |
| 2011/0137875 | A1* | 6/2011 | Ziauddin | G06F 16/2393 |
| | | | | 707/693 |
| 2011/0196857 | A1* | 8/2011 | Chen | G06F 16/24539 |
| | | | | 707/714 |
| 2012/0089563 | A1* | 4/2012 | Bakalash | G06F 17/30489 |
| | | | | 707/602 |
| 2012/0271845 | A1* | 10/2012 | Netz | G06F 16/244 |
| | | | | 707/769 |
| 2013/0151491 | A1* | 6/2013 | Gislason | G06F 16/2282 |
| | | | | 707/696 |
| 2014/0280029 | A1* | 9/2014 | Ding | G06F 16/24539 |
| | | | | 707/717 |
| 2014/0310232 | A1* | 10/2014 | Plattner | G06F 16/24539 |
| | | | | 707/602 |

OTHER PUBLICATIONS

Aouiche et al. "Index and Materialized View Selection in Data Warehouses". Jan. 27, 2017. URL Link: https://arxiv.org/ftp/arxiv/papers/1701/1701.08029.pdf. Accessed Aug. 2018. (Year: 2017).*

From Dual. "Materialized Views with MySQL". Oct. 31, 2013 snapshot via Archive.org. URL Link: http://www.fromdual.com/mysql-materialized-views. Accessed Aug. 2018. (Year: 2013).*

Gvirtz. "My experience with materialized views in Sybase ASE". Nov. 3, 2013. URL Link: http://leonid-gvirtz.typepad.com/blog/2013/11/my-experience-with-materialized-views-in-sybase-ase.html. Accessed Aug. 2018. (Year: 2013).*

Microsoft. "Indexed (materialized) views in Microsoft SQL Server". Mar. 24, 2011. URL Link: http://aboutsqlserver.com/2011/03/24/indexed-materialized-views-in-microsoft-sql-server/. Accessed Aug. 2018. (Year: 2011).*

Oracle. "Oracle9i Advanced Replication Release 2 (9.2) Manual", ch. 3 on "Materialized View Concepts and Architecture". Oct. 8, 2013 snapshot via Archive.org. URL Link: https://docs.oracle.com/cd/A97630_01/server.920/a96567/repmview.htm. Accessed Aug. 2018. (Year: 2013).*

Oracle. "Oracle Database Online Documentation, 10g Release 2 (10.2)". Section on "Create Materialized View". Oct. 19, 2013 snapshot via Archive.org. URL Link: https://docs.oracle.com/cd/B19306_01/server.102/b14200/statements_6002.htm. Accessed Aug. 2018. (Year: 2013).*

PostgreSQL. "PostgreSQL 9.3 Manual", ch. 38.3 on "Materialized Views". Oct. 19, 2013 snapshot via Archive.org. URL Link: https://www.postgresql.org/docs/9.3/static/rules-materializedviews.html. Accessed Aug. 2018. (Year: 2013).*

Roussopoulos. "Materialized Views and Data Warehouses." ACM SIGMOD Record vol. 27, Issue 1, Mar. 1998. pp. 21-26. URL Link: https://dl.acm.org/citation.cfm?doid=273244.273253. Accessed Jul. 2018. (Year: 1998).*

Winand. "with—Organize Complex Queries". Aug. 7, 2018 snapshot. URL Link: https://modern-sql.com/feature/with. Accessed Aug. 2018. (Year: 2018).*

Oracle Database Online Documentation, 10g Release 2 (10.2) / Administration. "Create Materialized View". Oct. 10, 2013 snapshot via Archive.org. URL Link: <https://docs.oracle.com/cd/B19306_01/server.102/b14200/statements_6002.htm>. Accessed Oct. 2019. (Year: 2013).*

International Search Report for GB1404521.5 dated Sep. 15, 2014, 4 pages.

* cited by examiner

DEMAND-DRIVEN DYNAMIC AGGREGATE

PRIOR FOREIGN APPLICATION

This application claims priority from United Kingdom patent application number 1404521.5, filed Mar. 14, 2014, which is hereby incorporated herein by reference in its entirety.

BACKGROUND

One or more aspects relate generally to generating an aggregate, and in particular to generating an aggregate in a data storage system.

Most of today's business and technical software applications require databases for storing and retrieving information. Due to the tremendous growth in the volume of data, it is imperative that databases only grow over time. However, a larger database requires more retrieval time. Under the term "big data" and "business analytics" business information solutions analyze and aggregate a huge amount of data—usually stored in database tables—to extract relevant information.

To accelerate access to the information, data often is aggregated in advance and is materialized in so-called aggregates. Physical representation of an aggregate might be, e.g., a database table, a materialized query table (MQT) as known as a (automatic) summary table ((A)ST), or a structure stored in memory or in a file system.

Designing aggregates is a challenging task since good aggregates are to support a reasonable amount of queries. However, queries are often not known in advance. Furthermore, there is a trade-off between the number of queries an aggregate supports and its size, i.e., storage consumption, maintenance effort and access performance. Furthermore, data in aggregates is to be maintained within a refresh/rollup procedure when the underlying container/table is updated. In summary, optimizing data access using aggregates is complex and requires sophisticated technology.

A couple of technologies are available to address this technical field. Document US 2010/0318527 A1, which is hereby incorporated by reference herein in its entirety, discloses a method and a system for dynamically creating aggregates. An aggregate table manager is instantiated that receives a plurality of aggregate table definitions, and generates aggregate tables based on received aggregate table definitions.

In document U.S. Pat. No. 8,515,948 B2, which is hereby incorporated by reference herein in its entirety, techniques are provided for creating one or more fine-grained access control rules that are associated with a base table. A materialized query table is created from the base table without applying the one or more fine-grained access control rules associated with the base table when obtaining data from the base table.

SUMMARY

According to one aspect, a method for generating an aggregate may be provided. The method may comprise: upon receiving a second query comprising a filter criterion, determining if at least a threshold number of previous first queries may comprise a similar filter criterion, and if so, generating an aggregate using the similar filter criterion as an aggregation criterion, such that future queries comprising the similar filter criterion may be satisfied by the aggregate.

According to another aspect, an aggregate builder for generating an aggregate may be provided. The aggregate builder may comprise a threshold determination unit adapted for upon receiving a second query comprising a filter criterion, determining if at least a threshold number of previous first queries comprises a similar filter criterion, wherein the threshold determination unit is further adapted for triggering an aggregate generation unit. The aggregate generation unit may be adapted for generating the aggregate using the similar filter criterion as an aggregation criterion, such that future queries comprising the similar filter criterion may be satisfied by the aggregate.

It may be noted that the time in which the second query may be executed, may be after the time either the first query has been performed or a group of first queries have been performed.

BRIEF DESCRIPTION OF THE DRAWINGS

Embodiments of the invention will now be described, by way of example only, and with reference to the following drawings.

DETAILED DESCRIPTION

Figure 1:
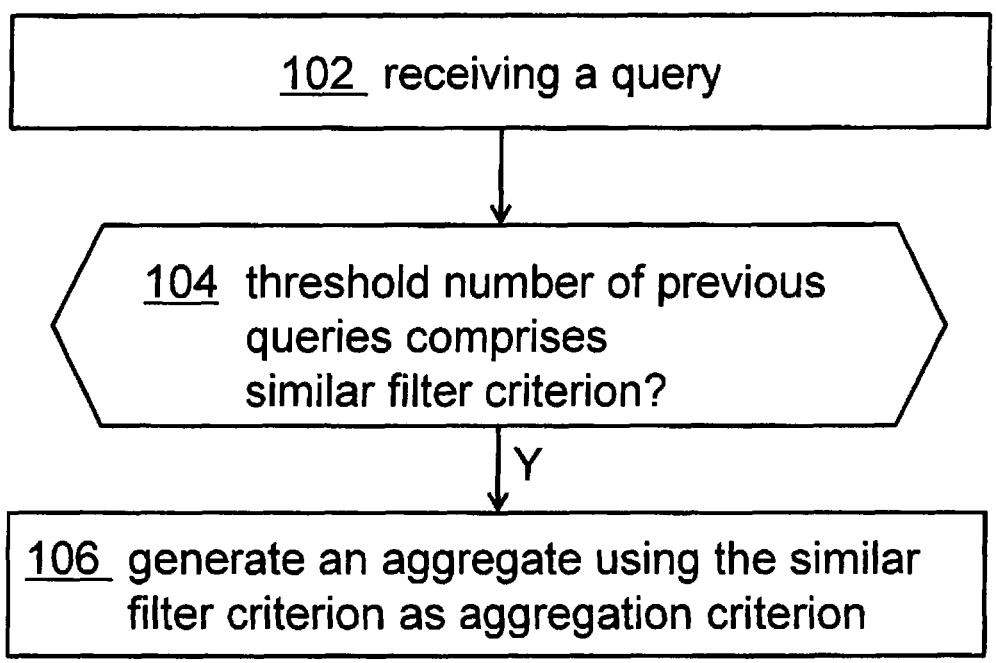
FIG. 1 shows one example of a flow chart of an embodiment of generating an aggregate.

It may be noted that a filter criterion may be composed of a set of filter conditions relating to specific filter fields.

In the context of this description, the following conventions, terms and/or expressions may be used:

The term "aggregate" may denote a prefabricated result summary of a group of query statements—like e.g., SQL (structure query language) or MDX (Multi-Dimensional Expression)—which may improve the performance of queries against a database or other data collections. At the simplest form, an aggregate may be a simple summary table that may be derived by performing a "Group by SQL" query. A more common use of aggregates may be to take a dimension and change the granularity of this dimension in the database.

The term "second query" may—in comparison to a "first query" or previous query—denote a data retrieval request against a database which may happen later than a first query. In general, a query may denote a request for data from a database.

The term "filter criterion" may denote one or more conditions defined in a query statement.

The term "similar filter criterion" may denote a filter criterion that may be related to another filter criterion such that the filter criteria are not completely different. That may, e.g., be the case if the related filtering criteria comprise identical filtering fields, or if a first set of filtering fields of the first query is a subset of a second set of filtering fields of the second query. This would mean that the second query may be more specific and that the result set of the query would also be a subset of the first query. Additionally, a number of different filtering values between the first query and the second query may be below a predefined threshold.

The term "filtering field", in particular in a query, may denote an argument of an SQL statement for which a condition is defined for a query.

The term "materialized query table" or "materialized view" may denote a database object that may contain the results of a query. E.g., it may be a local copy of data located remotely, or may be a subset of the rows and/or columns of a table or join result, or may be a summary based on aggregations of a table's data. Materialized views, which store data based on remote tables, are also known as snapshots. Also a snapshot may be a materialized view. All of this may relate to the relational database model. A view may be seen as a virtual table representing the result of a database query. Whenever a query or an update addresses an ordinary view's virtual table, the database management system may convert these into queries or updates against the underlying base tables. A materialized view may take a different approach in which the query result may be cached as a concrete table that may be updated from the original base tables from time to time. This may enable much more efficient access, at the cost of some data being potentially out-of-date. It may be particularly useful in data warehousing scenarios, where frequent queries of the actual base tables can be extremely expensive in terms of computational requirements.

In accordance with one or more aspects, aggregates do not need to be designed upfront. No programmer may be required to define and create aggregates. A pre-definition of aggregates may be obsolete. Further, there may be no need to maintain aggregates and aggregate definitions. The design and structure of the aggregates may be created dynamically, i.e., on the fly. An update of underlying base data or underlying data containers or tables automatically may invalidate a current aggregate. The creating of new aggregates may be governed by ongoing query workload. Thus, the aggregates may be adapted dynamically, automatically and permanently. Instead of inflexible large aggregates according to state of the art technology, small, dense, demand-driven aggregates may be created increasing the performance of a data storage system like a relational database. This way, existing resources of a computer system underlying the data storage system may be used more efficiently by these demand-driven dynamic aggregates.

According to one embodiment, a first query and a second query may be determined to comprise a similar filter criterion if the related filtering criteria comprise identical filtering fields or, if a first set of filtering fields of the first query is a subset of a second set of filtering fields of the second query, and wherein a number of different filtering values between the first query and the second query is below a predefined threshold. These conditions may be definable in software if the method may be a computer implemented method.

In a further embodiment, the technique may comprise determining cardinalities of values relating to at least one of the filtering fields comprised in the filter criterion having generated the aggregate, and determining if the cardinalities may exceed a threshold count. If that is the case, the filter criterion may be narrowed such that a smaller aggregate may be built. Cardinalities may be understood as a number of occurrences of values corresponding to a filtering field (e.g., records) in a result set of a query. A narrowing of the filter criterion may, e.g., be achieved by dividing the value range of a related filter field into an upper portion and a lower portion, i.e., cut the value range into two halves. However, any other technique for lowering the number of results in the result set of a query may be adequate.

In an alternative embodiment, it may be determined if an estimated aggregate size for a filter criterion may exceed a size threshold. If that is the case, the filter criterion may be narrowed down such that a smaller sized aggregate may be built. Such a narrowed down or restricted filtering condition on at least one filtering field may be generated such that the estimated size of the corresponding aggregate may be reduced below the threshold size. The calculation of the estimated aggregate size may be based on a size of result sets of previous queries and a number of valid or allowed values for one or more filtering fields. A valid or allowed value may be a value that fits into the context of the value and may thus be flagged in related meta data accordingly. E.g., a calendar year has only 12 months, thus, a month with a value 14 may not be allowed. The same may apply to store-IDs of a retailer who may only have a number X of stores. Thus, a number greater than the maximum_store_number may not be allowed.

According to one additional embodiment, the query expressions of queries may be stored. This may be the basis for comparing them later-on with previous queries and determining their similarity.

According to a further embodiment, the aggregate may be stored as a database table. Alternatively or in addition, the aggregate may be stored as a materialized query table or a materialized view. This may have the advantage that storage technologies and devices already in use may be re-used.

In a further embodiment, the aggregate may be stored as a data structure in a memory. This may be RAM (random access memory), an SSD (solid state disk) or other storage media of a computer. Furthermore, the aggregate may be stored as a file in a file system using capabilities of an operating system for efficiency.

In several embodiments, the aggregate may relate to a relational database and may be generated as a component of such a relational database, thereby making use of the inherited functions of a modern relational database system.

In other embodiments, the aggregate may be generated as part of a hierarchical database or a network database. Potentially, also data stores for unstructured data, e.g., a CMS (content management system) may be possible.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, e.g., between features of the method type claims, and features of the apparatus type claims, is considered to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, block diagrams of embodiments of a method for generating an aggregate are given. Afterwards, further embodiments of an aggregate builder are described.

FIG. 1 shows an embodiment of a method 100 for generating an aggregate. Method 100 for generating an aggregate, in particular in a database, in general or a usual relational database, may be composed of several steps: Upon receiving, 102, a query—which may for comprehensibility reasons be denoted as a second query and may comprise a filter criterion, which may be a group of conditions, e.g., expressed as an SQL statement—a determination may be performed, 104, to evaluate if at least a threshold number of previous first queries comprises a similar filter criterion. A previous first query may have been executed during a predefined time period before the received query. If the similarity comparison yields a positive answer, the method may comprise generating, 106, an aggregate using the similar filter criterion as an aggregation criterion, such that future queries comprising the similar filter criterion are satisfied by the aggregate.

Figure 2:
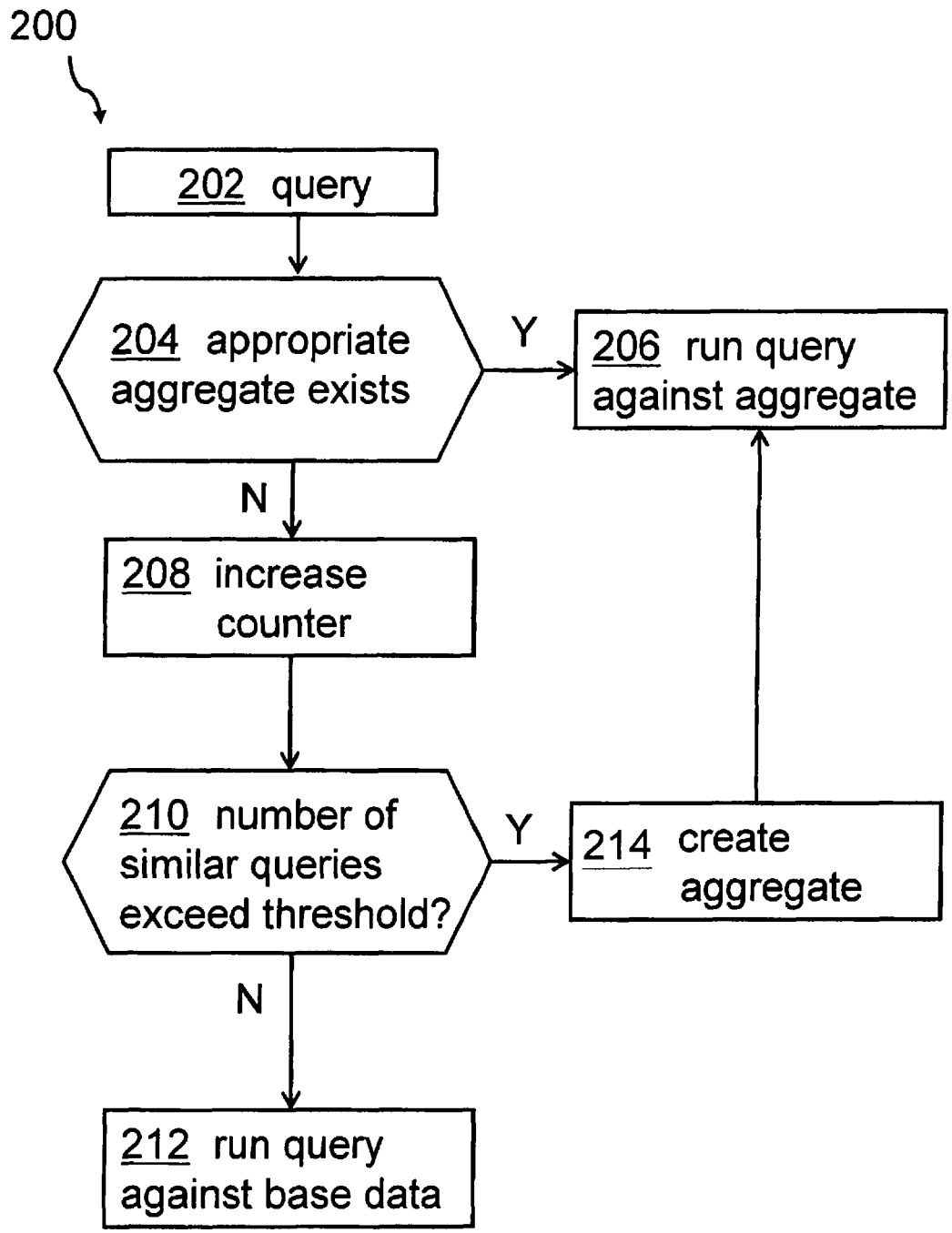
FIG. 2 shows one example of a more detailed flowchart of generating an aggregate.

FIG. 2 shows a more detailed flowchart of generating an aggregate. A query may be received, 202. It may be tested whether an appropriate aggregate exists, 204. In case of "YES", the query may be executed against the aggregate, 206. In case of "NO", a counter may be increased, 208, indicating that no appropriate query exists. The counter may be related to the query being executed. If the numeric value of the counter does not exceed a predefined threshold, 210, the query may be run 212, against base data. However, if the numeric value of the counter exceeds a predefined threshold, the method may—together or based on a related system—create, 214, the aggregate relating to the received query. For future queries of the same or similar type, the query may now be run, 206, against the aggregate which may be executed faster compared to a query being executed against the underlying database.

It may be noted that not only exactly the same query may be satisfied by the aggregate, but also queries with similar filter criterions because the aggregate has been built on an abstraction layer above the native query. Thus, the aggregate is a generalization of the native query.

In order to illustrate the functionality of the aggregate building, the following example may be considered. It queries the sum of revenue from different retail stores having different retail store numbers for the same day:

TABLE 1

| seq | SQL query | count |
|---|---|---|
| 1 | SELECT SUM(REV) FROM BIG_TAB WHERE CALMONTH = 06.2013 AND STORE_ID = 5 | 1 |

TABLE 1-continued

| seq | SQL query | count |
|---|---|---|
| 2 | SELECT SUM(REV) FROM BIG_TAB WHERE CALMONTH = 06.2013 AND STORE_ID = 4 | 2 |
| 3 | SELECT SUM(REV) FROM BIG_TAB WHERE CALMONTH = 06.2013 AND STORE_ID = 5 AGGREGATE BUILDING rewrite SELECT SUM(REV) FROM AGGREGATE WHERE STORE_ID = 5 | 3 |
| 4 | SELECT SUM(REV) FROM BIG_TAB WHERE CALMONTH = 06.2013 AND STORE_ID = 8 → rewrite SELECT SUM(REV) FROM AGGREGATE WHERE STORE_ID = 8 | |
| 5 | SELECT SUM(REV) FROM BIG_TAB WHERE CALMONTH = 06.2013 AND STORE_ID = 4 → rewrite SELECT SUM(REV) FROM AGGREGATE WHERE STORE_ID = 4 | |
| ... | | |

"seq" may indicate the sequence of incoming queries, and "count" may indicate the counter for queries having a similar filter criterion.

In this example, the number of similar queries may have reached a given threshold, e.g. "3". Thus, at sequence 3, an aggregate may be built that may be used for all possible future queries that may comply with the same/similar query pattern. The aggregate may be built by the following query:

SELECT REV, STORE_ID FROM BIG_TAB
WHERE CALMONTH=06.2013 AND STORE_ID=*

"*" may indicate a wildcard, meaning that any value may be possible. In SQL this is equivalent to removing the condition at all. The query has been generalized in order to satisfy the similarity condition. All subsequent queries that are supported by the aggregate may be executed against the aggregate. Moreover, the rewrite process may be transparent—meaning invisible—for the caller/user/retrieval process.

To continue with the example: The table BIG_TAB may have the following layout:

TABLE 2

| BIG_TAB | | | | |
|---|---|---|---|---|
| CALMONTH | STORE_ID | CUSTOMER | REVENUE | ... |
| 05.2013 | 5 | 002 | 585,43 | ... |
| 06.2013 | 4 | 001 | 123,43 | ... |
| 06.2013 | 5 | 002 | 222,22 | ... |
| 06.2013 | 5 | 003 | 333,22 | ... |
| 06.2013 | 5 | 004 | 111,11 | ... |
| 06.2013 | 8 | 003 | 543,38 | ... |
| 07.2013 | 5 | 002 | 285,87 | ... |

An appropriate aggregate may be built by the SQL statement

CREATE AGGREGATE AS (SELECT STORE_ID, SUM(REV) FROM BIG_TAB
WHEREIN CALMONTH=06.2013 GROUP BY STORE_ID)

The aggregate may look like this:

TABLE 3

| AGGREGATE | |
|---|---|
| STORE_ID | REVENUE |
| 4 | 123,43 |
| 5 | 666,66 |
| 8 | 543,38 |

Such an aggregate may speed up future queries having similar selection criteria, as explained above.

If in the example of table 3 it may be determined that cardinalities of values of at least one of the filtering fields—i.e., number of lines of table 3—exceed a threshold count, the related filtering criterion may be narrowed. It may be noted that the filtering fields are here STORE_ID and CALMONTH. If, e.g., the threshold count may be pre-defined as or set to 10 and the number of lines in the result table, i.e., table 3, may be 12 to build the aggregate, the filter criterion to create the aggregate may be narrowed by dividing the month in two halves or, by building an aggregate for only 50% of all stores. Hence, either the filtering field CALMONTH or STORE_ID may get an additional condition on the related SQL-statement. This may reduce the number of lines, i.e. cardinalities of values. Thus, a smaller, more effective aggregate may be built.

Figure 3:
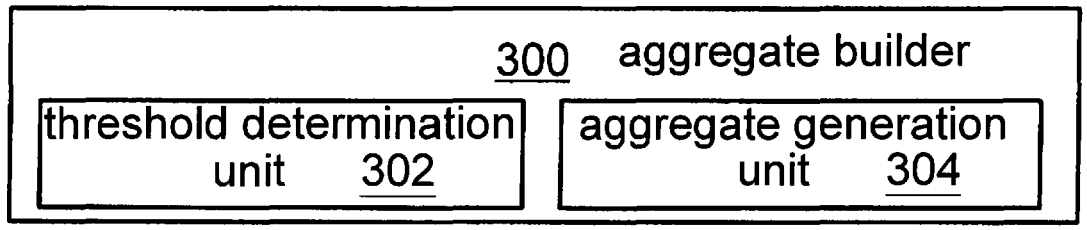
FIG. 3 shows one example of a structural chart of an embodiment of an aggregate builder.

FIG. 3 shows a structural depiction of an embodiment of the aggregate builder 300 for generating an aggregate. It may comprise a threshold determination unit 302 adapted for: upon receiving a second query comprising a filter criterion, determining if at least a threshold number of previous first queries comprises a similar filter criterion, wherein the threshold determination unit 302 is further adapted for triggering an aggregate generation unit 304. The aggregate generation unit 304 may be adapted for generating the aggregate using the similar filter criterion as an aggregation criterion. This way, future queries comprising the similar filter criterion, may be satisfied by the aggregate.

Figure 4:
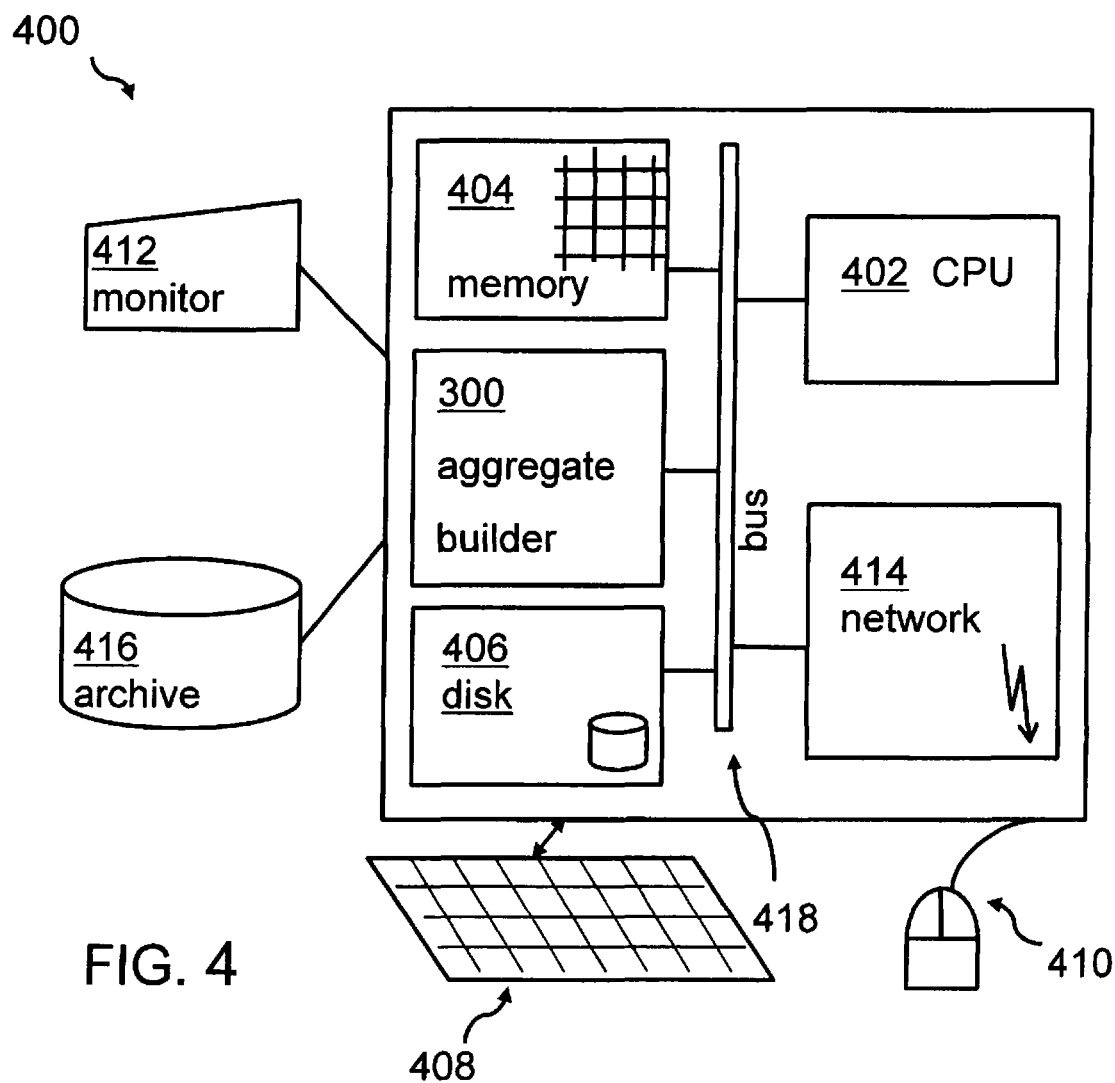
FIG. 4 shows one example of a structural chart of an embodiment of a computer system comprising the aggregate builder.

Embodiments of the invention may be implemented together with virtually any type of computer, regardless of the platform, being suitable for storing and/or executing program code. For example, as shown in FIG. 4, a computing system 400 may include one or more processor(s) 402 with one or more cores per processor, associated memory elements 404, an internal storage device 406 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 404 may include a main memory, e.g., a random access memory (RAM), employed during actual execution of the program code, and a cache memory, which may provide temporary storage of at least some program code and/or data in order to reduce the number of times code and/or data is to be retrieved from a long-term storage medium or external bulk storage 416 for an execution. Elements inside the computer 400 may be linked together by means of a bus system 418 with corresponding adapters. Additionally, the aggregate builder 300 may be attached to the bus system 418.

The computing system 400 may also include input means, such as a keyboard 408, a pointing device such as a mouse 410, or a microphone (not shown). Alternatively, the computing system may be equipped with a touch sensitive screen as a main input device. Furthermore, the computer 400, may include output means, such as a monitor or screen 412 [e.g., a liquid crystal display (LCD), a plasma display, a light emitting diode display (LED), or cathode ray tube (CRT) monitor]. The computer system 400 may be connected to a network (e.g., a local area network (LAN), a wide area network (WAN), such as the Internet or any other similar type of network, including wireless networks via a network interface connection 414. This may allow a coupling to other computer systems or a storage network or a tape drive. Those skilled in the art will appreciate that many different types of computer systems exist, and the aforementioned input and output means may take other forms. Generally speaking, the computer system 400 may include at least the minimal processing, input and/or output means, necessary to practice embodiments of the invention.

While aspects of the invention have been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the claims. Also, elements described in association with different embodiments may be combined. It should also be noted that reference signs in the claims, if any, should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below, if any, are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications, as are suited to the particular use contemplated.

What is claimed is:

1. A method of generating an aggregate, the method comprising:

receiving, by one or more processors, a second query for execution subsequent to executing a number of previous first queries;

determining, by the one or more processors, if the second query can be executed against an aggregate to obtain data responsive to the second query, wherein the aggregate comprises a prefabricated result summary of a group of query statements;

based on determining that the second query cannot be executed against the aggregate, obtaining, by the one or more processors, a value from a counter, wherein the value indicates a number of times the second query has been received by the one or more processors for execution;

based on determining that the second query has been received by the one or more processors for execution a predefined number of times, optimizing, by the one or more processors, efficiency related to data accesses in a database by generating a new aggregate, the generating comprising:

based on receiving the second query comprising a filter criterion, determining whether at least a threshold number of previous first queries executed during a predefined time period before receiving the second query comprise a similar filter criterion, wherein a first query of the at least the threshold number of previous first queries comprises the similar filter criterion if a first set of filtering fields of the first query is a subset of a second set of filtering fields of the second query and a number of different filtering values between the first query and the second query is below a predefined threshold number of different filtering values;

based on determining, responsive to receiving the second query, that the at least the threshold number of previous first queries comprise the similar filter criterion, dynamically generating the new aggregate, on-the-fly, using the similar filter criterion as an aggregation criterion, wherein future queries comprising the similar filter criterion or comprising the filter criterion, are satisfied by executing the future queries against the new aggregate instead of against containers or tables of the database comprising underlying base data of the new aggregate, wherein the new aggregate is generated using filtering fields comprised in aggregate generating filter criterion, wherein the second query is satisfied by being executed against the new aggregate and the second query comprises a native query of the new aggregate, and wherein the new aggregate is generated on an abstraction layer above the native query such that the new aggregate is a generalization of the native query; and satisfying, by the one or more processors, the second query by executing the second query against the new aggregate, wherein the new aggregate provides data responsive to the second query;

receiving, by the one or more processors, a new query for execution against the database to access data in the database;

determining, by the one or more processors, that the new query comprises the similar filter criterion or the filter criterion;

determining, by the one or more processors, if one or more of the containers or the tables of the database comprising the underlying base data of the new aggregate have been updated;

based on determining that the underlying base data of the new aggregate have been updated, automatically invalidating, by the one or more processors, the new aggregate and automatically executing the new query against the containers or the tables of the database comprising the underlying base data of the new aggregate;

based on determining that the underlying base data of the new aggregate have not been updated, automatically executing, by the one or more processors, the new query against the new aggregate instead of against the containers or the tables of the database comprising the underlying base data of the new aggregate, wherein the new aggregate provides data responsive to the new query, wherein the executing comprises:

determining, based on executing the new query against the new aggregate, that a number of occurrences of values corresponding to a filtering field comprised in the filter criterion having generated the new aggregate exceed a threshold count; and generating a smaller aggregate based on narrowing the new aggregate by dividing the value range of the filter field into an upper portion and a lower portion to lower a number of results in the result set of the new query.

2. The method according to claim 1, further comprising:
determining whether an estimated size aggregate for a selected filter criterion exceeds a size threshold; and
based on the estimated size aggregate for the selected filter criterion exceeding the size threshold, narrowing the selected filter criterion such that a smaller sized aggregate is built.

3. The method according to claim 1, wherein query expressions of at least one of the second query and one or more of the first queries are stored.

4. The method according to claim 1, wherein the new aggregate is stored as a database table.

5. The method according to claim 1, wherein the new aggregate is a materialized query table.

6. The method according to claim 1, wherein the new aggregate is stored as a data structure in a memory of a computer.

7. The method according to claim 1, wherein the new aggregate is stored as a file in a file system.

8. The method according to claim 1, wherein the new aggregate relates to a relational database.

9. The method according to claim 1, wherein the new aggregate is generated as part of a hierarchical database or a network database.

10. An aggregate builder for generating an aggregate, the aggregate builder comprising:
a memory;
one or more processors in communication with the memory; and
program instructions executable by the one or more processors via the memory to perform a method, the method comprising:
receiving, by the one or more processors, a second query for execution subsequent to executing a number of previous first queries;
determining, by the one or more processors, if the second query can be executed against an aggregate to obtain data responsive to the second query, wherein the aggregate comprises a prefabricated result summary of a group of query statements;
based on determining that the second query cannot be executed against the aggregate, obtaining, by the one or more processors, a value from a counter, wherein the value indicates a number of times the second query has been received by the one or more processors for execution;
based on determining that the second query has been received by the one or more processors for execution a predefined number of times, optimizing, by the one or more processors, efficiency related to data accesses in a database by generating a new aggregate, the generating comprising:
based on receiving the second query comprising a filter criterion, determining whether at least a threshold number of previous first queries executed during a predefined time period before receiving the second query comprise a similar filter criterion, wherein a first query of the at least the threshold number of previous first queries comprises the similar filter criterion if a first set of filtering fields of the first query is a subset of a second set of filtering fields of the second query and a number of different filtering values between the first query and the second query is below a predefined threshold number of different filtering values;
based on determining, responsive to receiving the second query, that the at least the threshold number of previous first queries comprise the similar filter criterion, dynamically generating the new aggregate, on-the-fly, using the similar filter criterion as an aggregation criterion, wherein future queries comprising the similar filter criterion or comprising the filter criterion, are satisfied by executing the future queries against the new aggregate instead of against containers or tables of the database comprising underlying base data of the new aggregate, wherein the new aggregate is generated using filtering fields comprised in aggregate generating filter criterion, wherein the second query is satisfied by being executed against the new aggregate and the second query comprises a native query of the new aggregate, and wherein the new aggregate is generated on an abstraction layer above the native query such that the new aggregate is a generalization of the native query; and
satisfying, by the one or more processors, the second query by executing the second query against the new aggregate, wherein the new aggregate provides data responsive to the second query;

receiving, by the one or more processors, a new query for execution against the database to access data in the database;

determining, by the one or more processors, that the new query comprises the similar filter criterion or the filter criterion;

determining, by the one or more processors, if one or more of the containers or the tables of the database comprising the underlying base data of the new aggregate have been updated;

based on determining that the underlying base data of the new aggregate have been updated, automatically invalidating, by the one or more processors, the new aggregate and automatically executing the new query against the containers or the tables of the database comprising the underlying base data of the new aggregate;

based on determining that the underlying base data of the new aggregate have not been updated, automatically executing, by the one or more processors, the new query against the new aggregate instead of against the containers or the tables of the database comprising the underlying base data of the new aggregate, wherein the new aggregate provides data responsive to the new query, wherein the executing comprises:

determining, based on executing the new query against the new aggregate, that a number of occurrences of values corresponding to a filtering field comprised in the filter criterion having generated the new aggregate exceed a threshold count; and generating a smaller aggregate based on narrowing the new aggregate by dividing the value range of the filter field into an upper portion and a lower portion to lower a number of results in the result set of the new query.

11. A computer program product for generating an aggregate, the computer program product comprising:

a non-transitory computer readable storage medium readable by a processing circuit and storing instructions for execution by the processing circuit for performing a method comprising:

receiving, by the one or more processors, a second query for execution subsequent to executing a number of previous first queries;

determining, by the one or more processors, if the second query can be executed against an aggregate to obtain data responsive to the second query, wherein the aggregate comprises a prefabricated result summary of a group of query statements;

based on determining that the second query cannot be executed against the aggregate, obtaining, by the one or more processors, a value from a counter, wherein the value indicates a number of times the second query has been received by the one or more processors for execution;

based on determining that the second query has been received by the one or more processors for execution a predefined number of times, optimizing, by the one or more processors, efficiency related to data accesses in a database by generating a new aggregate, the generating comprising:

based on receiving the second query comprising a filter criterion, determining whether at least a threshold number of previous first queries executed during a predefined time period before receiving the second query comprise a similar filter criterion, wherein a first query of the at least the threshold number of previous first queries comprises the similar filter criterion if a first set of filtering fields of the first query is a subset of a second set of filtering fields of the second query and a number of different filtering values between the first query and the second query is below a predefined threshold number of different filtering values;

based on determining, responsive to receiving the second query, that the at least the threshold number of previous first queries comprise the similar filter criterion, dynamically generating the new aggregate, on-the-fly, using the similar filter criterion as an aggregation criterion, wherein future queries comprising the similar filter criterion or comprising the filter criterion, are satisfied by executing the future queries against the new aggregate instead of against containers or tables of the database comprising underlying base data of the new aggregate, wherein the new aggregate is generated using filtering fields comprised in aggregate generating filter criterion, wherein the second query is satisfied by being executed against the new aggregate and the second query comprises a native query of the new aggregate, and wherein the new aggregate is generated on an abstraction layer above the native query such that the new aggregate is a generalization of the native query; and satisfying, by the one or more processors, the second query by executing the second query against the new aggregate, wherein the new aggregate provides data responsive to the second query;

receiving, by the one or more processors, a new query for execution against the database to access data in the database;

determining, by the one or more processors, that the new query comprises the similar filter criterion or the filter criterion;

determining, by the one or more processors, if one or more of the containers or the tables of the database comprising the underlying base data of the new aggregate have been updated;

based on determining that the underlying base data of the new aggregate have been updated, automatically invalidating, by the one or more processors, the new aggregate and automatically executing the new query against the containers or the tables of the database comprising the underlying base data of the new aggregate;

based on determining that the underlying base data of the new aggregate have not been updated, automatically executing, by the one or more processors, the new query against the new aggregate instead of against the containers or the tables of the database comprising the underlying base data of the new aggregate, wherein the new aggregate provides data responsive to the new query, wherein the executing comprises:

determining, based on executing the new query against the new aggregate, that a number of occurrences of values corresponding to a filtering field comprised in the filter criterion having generated the new aggregate exceed a threshold count; and generating a smaller aggregate based on narrowing the new aggregate by dividing the value range of the filter field into an upper portion and a lower portion to lower a number of results in the result set of the new query.

12. The computer program product according to claim 11, wherein the method further comprises:

determining whether an estimated size aggregate for a selected filter criterion exceeds a size threshold; and based on the estimated size aggregate for the selected filter criterion exceeding the size threshold, narrowing the selected filter criterion such that a smaller sized aggregate is built.

13. The computer program product according to claim 11, wherein query expressions of at least one of the second query and one or more of the first queries are stored.

14. The computer program product according to claim 11, wherein the new aggregate is stored as a database table.

15. The computer program product according to claim 11, wherein the new aggregate is a materialized query table.

16. The computer program product according to claim 11, wherein the new aggregate is stored as a data structure in a memory of a computer, or as a file in a file system.

* * * * *